Oct. 16, 1928.
M. A. CLEVENGER
1,687,830
AIR ODORIZER FOR ELECTRIC FANS
Filed April 18, 1927
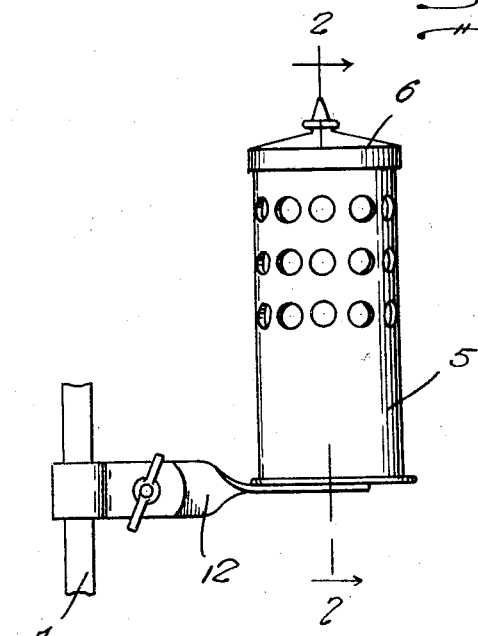
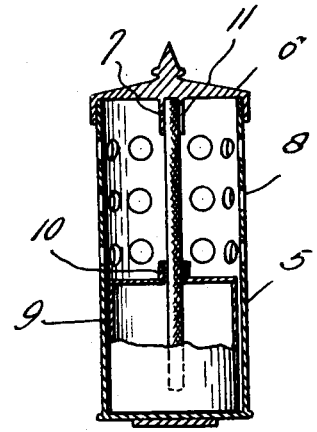
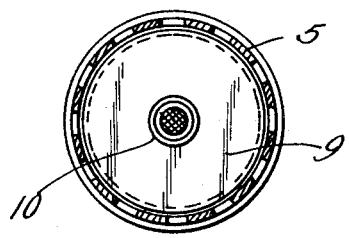
Inventor
M. A. Clevenger
By Clarence A. O'Brien
Attorney Patented Oct. 16, 1928.

1,687,830

UNITED STATES PATENT OFFICE.

MERRITT A. CLEVENGER, OF GREENVILLE, MICHIGAN.

AIR ODORIZER FOR ELECTRIC FANS.

Application filed April 18, 1927. Serial No. 184,699.

This invention relates to new and useful improvements in odorizing attachments for electric fans and aims to provide a highly novel, simple, and inexpensive device of this character that may be readily attached to the protecting frame of the fan blades and that includes a main container having arranged therein a liquid container within which is arranged one end of a length of wick material, the main container having openings therein surrounding the wick so that as the air is blown therethrough, the same will become odorized by impinging against the wick which is continuously saturated by the odorant within the small container.

In the drawing wherein like numerals of reference indicate corresponding characters throughout the several views:

Figure 1 is a side elevation of my improved air odorizer.

Figure 2 is a longitudinal section taken substantially upon the line 2—2 of Figure 1, and Figure 3 is a transverse section taken through the upper end of the device.

Now having particular reference to the drawing, my novel air odorizer consists of a small ornamental container 5, preferably of circular shape in cross section, open at its upper end and upon which is disposed a readily removable top 6, the inner side of which is formed centrally with a depending sleeve 7. The upper end of this container 5 is formed with circumferentially spaced air inlet and discharge openings 8. Removably arranged within the interior of this container 5 is a small and similarly shaped container 9, the top wall of which is formed with a central opening 10. This container 9 is provided for the purpose of receiving a suitable fluid odorant, and as clearly indicated in Figure 2, a length of wick such as cord or the like 11, is arranged at one end within the cap sleeve 7, said wick extending downwardly through the opening 10 in the odorant container 9 with an obvious result.

The lower end of the main container 5 is equipped with a suitable horizontal clamp 12 to facilitate the attachment of the device to one of the frame wires A of the conventional electric fan blade guard. Obviously as the air from the blades passes into the container 5 at one side thereof, the same will be thoroughly odorized by coming into contact with the wick 11, after which the air will pass out through the other side in a manner readily apparent.

Having thus described the invention, what I claim as new and desire to secure by Letters Patent is:—

In a diffuser of the class described, a casing open at its upper end, a removable cover therefor, a depending sleeve formed centrally on the bottom of the cover, an odorant container of materially less height than said casing removably arranged within the casing for rest upon the bottom thereof, said container being closed and formed in its top with a filling neck, a wick secured at its upper end in said sleeve, the lower end of the wick extending downwardly through the filling neck into the container, the upper portion of the casing being formed with a series of spaced air openings.

In testimony whereof I affix my signature.

MERRITT A. CLEVENGER.